US012625052B2

(12) United States Patent
Fox et al.

(10) Patent No.: US 12,625,052 B2
(45) Date of Patent: May 12, 2026

(54) NOZZLE SEALING AND UNCLOG STATION FOR A FLOW CYTOMETER

(71) Applicant: Life Technologies Corporation, Carlsbad, CA (US)

(72) Inventors: Daniel N Fox, Bellvue, CO (US); Nathan M Fox, Fort Collins, CO (US); Rodney C Harris, Fort Collins, CO (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 961 days.

(21) Appl. No.: 17/324,286

(22) Filed: May 19, 2021

(65) Prior Publication Data

US 2021/0364408 A1     Nov. 25, 2021

Related U.S. Application Data

(60) Provisional application No. 63/184,998, filed on May 6, 2021, provisional application No. 63/027,016, filed on May 19, 2020.

(51) Int. Cl.
*G01N 15/1404*        (2024.01)
(52) U.S. Cl.
CPC . *G01N 15/1404* (2013.01); *G01N 2015/1418* (2013.01)
(58) Field of Classification Search
CPC ................... G01N 15/1404; G01N 2015/1418
See application file for complete search history.

(56) References Cited

U.S. PATENT DOCUMENTS

| | | | | |
|---|---|---|---|---|
| 4,790,653 | A | 12/1988 | North, Jr. | |
| 5,891,734 | A * | 4/1999 | Gill ...................... | G01N 35/109 |
| | | | | 436/805 |
| 5,939,326 | A * | 8/1999 | Chupp ............... | G01N 35/1004 |
| | | | | 436/805 |
| 6,027,691 | A * | 2/2000 | Watts ................... | G01N 35/025 |
| | | | | 422/67 |
| 6,746,873 | B1 * | 6/2004 | Buchanan .......... | G01N 15/1404 |
| | | | | 209/127.4 |
| 7,220,385 | B2 * | 5/2007 | Blecka ............... | G01N 35/0099 |
| | | | | 422/561 |
| 7,758,811 | B2 * | 7/2010 | Durack .............. | G01N 15/1459 |
| | | | | 436/63 |
| 9,551,644 | B2 * | 1/2017 | Kennington ....... | G01N 15/1012 |
| 9,592,483 | B2 * | 3/2017 | Fox ......................... | B01F 33/30 |
| 10,732,088 | B2 * | 8/2020 | Fox .................... | G01N 15/1404 |
| 2002/0192113 | A1 * | 12/2002 | Uffenheimer ...... | G01N 35/1002 |
| | | | | 422/562 |

(Continued)

FOREIGN PATENT DOCUMENTS

| | | |
|---|---|---|
| EP | 1062494 A1 | 12/2000 |
| EP | 1403633 A2 | 3/2004 |

*Primary Examiner* — Craig M Schneider
*Assistant Examiner* — Christopher D Ballman

(57)            ABSTRACT

Disclosed is a system for use in a flow cytometer for unclogging obstructions in a nozzle from salt crystal formations and clumps of cells or debris. A nozzle system is moved to a docking station so that a nozzle tip is seated in the docking station. Deionized water is pushed through the nozzle in a reverse direction to a waste port so that the nozzle is flushed. The nozzle system can remain in the docked position during nonuse so that salt crystals do not form in or on the nozzle.

7 Claims, 4 Drawing Sheets

(56)          References Cited

U.S. PATENT DOCUMENTS

2003/0223472 A1 *  12/2003  Ravalico ............ G01N 35/1016
                                                    374/31
2009/0293910 A1 *  12/2009  Ball ........................ B01L 13/02
                                                    15/97.1

* cited by examiner

NOZZLE SEALING AND UNCLOG STATION FOR A FLOW CYTOMETER

CROSS REFERENCE TO RELATED APPLICATIONS

The present application claims priority to and the benefit of U.S. patent application No. 63/027,016, "Nozzle Sealing And Unclog Station For Flow Cytometry" (filed May 19, 2020) and U.S. patent application No. 63/184,998, "Nozzle Sealing And Unclog Station For Flow Cytometry" (filed May 6, 2021), the entireties of which foregoing applications are incorporated herein by reference for any and all purposes.

TECHNICAL FIELD

The present disclosure relates to the field of flow cytometers and to the field of fluidic washing systems.

BACKGROUND

Flow cytometers are important tools for both sorting and analyzing cells, and are useful in providing important information regarding cells and also in providing sorted cells for various purposes. Flow cytometers operate using various working fluids, including sheath fluids and other carrier fluids. These working fluids can, under certain conditions, evaporate leave behind material (e.g., salts) that in turn inhibit the flow cytometer's performance and require removal.

To date, a number of attempts have been made to prevent clogs from forming on or in the nozzle. For example, disposable nozzles have been made so that nozzle can be replaced each time the system is used. This approach, however, results in significant cost to the user and also requires the operator to replace the tip each time the flow cytometer is used. Other approaches—such as requiring the operator to manually remove the nozzle tip after each use for cleaning—similarly time-consuming, cutting into operator time and creating downtime for the flow cytometer system. Accordingly, there is a long-felt need in the field for systems and methods for unclogging flow cytometers and other fluidic systems.

SUMMARY

The present invention may therefore comprise a method of unclogging and sealing a nozzle in a flow cytometer comprising: moving a nozzle system of the flow cytometer from an operating position that is aligned with a docking station; lowering the nozzle system to a docking position on a docking station so that a nozzle tip of the nozzle system is inserted into a tip sealing cup of the docking station to form a seal between the tip sealing cup and the nozzle tip; pumping rinse fluid from the docking station through the nozzle tip and to a waste port to unclog obstructions present in the nozzle system and flush sheath fluid from the nozzle system; holding the nozzle system in the docking position until operation of the flow cytometer is initiated.

The present invention may further comprise a system for unclogging and sealing a nozzle in a flow cytometer comprising: a nozzle system comprising a nozzle that creates a stream of sheath fluid that flows through a nozzle tip; a sheath supply port that provides a supply of pressurized sheath fluid to the nozzle; a sheath supply valve that opens and closes the sheath supply port to the nozzle; a waste disposed port that provides access to a disposal of waste fluids; a waste valve that opens and closes the waste disposal port; a docking station comprising: a rinse fluid supply that has a predetermined pressure; a tip sealing cup coupled to the rinse fluid supply; a nozzle mover coupled to the nozzle system that moves the nozzle system from an operating position to a docking position where the nozzle tip is inserted into the tip sealing cup so that the rinse fluid supply can be flushed through the nozzle to the waste disposal port when the waste valve is closed.

In one aspect, the present disclosure provides methods of unclogging a flow cytometer, comprising: converting the flow cytometer from an operating state to a docking state such that in the docking state, a nozzle system of the flow cytometer is aligned with a docking station, the converting being effected by relative motion between the nozzle system and the docking position, the docking state being such that a nozzle tip of the nozzle system engages with a tip sealing cup of the docking station so as to form a seal between the tip sealing cup and the nozzle tip, the nozzle tip being in fluid communication with at least one fluid pathway of the nozzle system; with a rinse fluid pump, communicating a rinse fluid from said docking station to the nozzle tip so as to flush the nozzle tip and at least a portion of the at least one fluid pathway.

Also provided are flow cytometer systems, comprising: a nozzle system comprising a nozzle tip and a sheath fluid conduit, the nozzle tip configured to communicate a sheath fluid therethrough and the nozzle tip being in communication with the sheath fluid conduit; a sheath supply valve configured to interrupt fluid communication between the nozzle tip and a supply of sheath fluid; a waste disposal port in fluid communication with the nozzle tip; a waste valve configured to interrupt fluid communication between the nozzle tip and the waste disposal port; a docking station, comprising: a rinse fluid conduit; a tip sealing cup, and a rinse fluid pump configured to exert rinse fluid into the rinse fluid conduit, the tip sealing cup configured to sealably engage with the nozzle tip so as to form a seal between the tip sealing cup and the nozzle tip; and a nozzle mover configured to move the nozzle system from an operating position to a docking position, in which docking position the nozzle tip engages with the tip sealing cup such that said rinse fluid can be communicated through the nozzle tip to the waste disposal port when said waste valve is open and said sheath supply valve is closed.

Further disclosed are methods, comprising: (a1) with a flow cytometer in an operating state, collecting one or more signals related to a first fluid exiting an orifice of the flow cytometer; in response to the at least one signal, converting the flow cytometer from the operating state to a docking state in which the orifice is in fluid communication with a source of rinse fluid; or (a2) in response to a predetermined schedule, converting a flow cytometer having an orifice from an operating state to a docking state in which the orifice is in fluid communication with a source of rinse fluid; or (a3) in response to a user input, converting a flow cytometer having an orifice from an operating state to a docking state in which the orifice is in fluid communication with a source of rinse fluid; and (b) while the flow cytometer is in the docking state, communicating a rinse fluid through the orifice.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
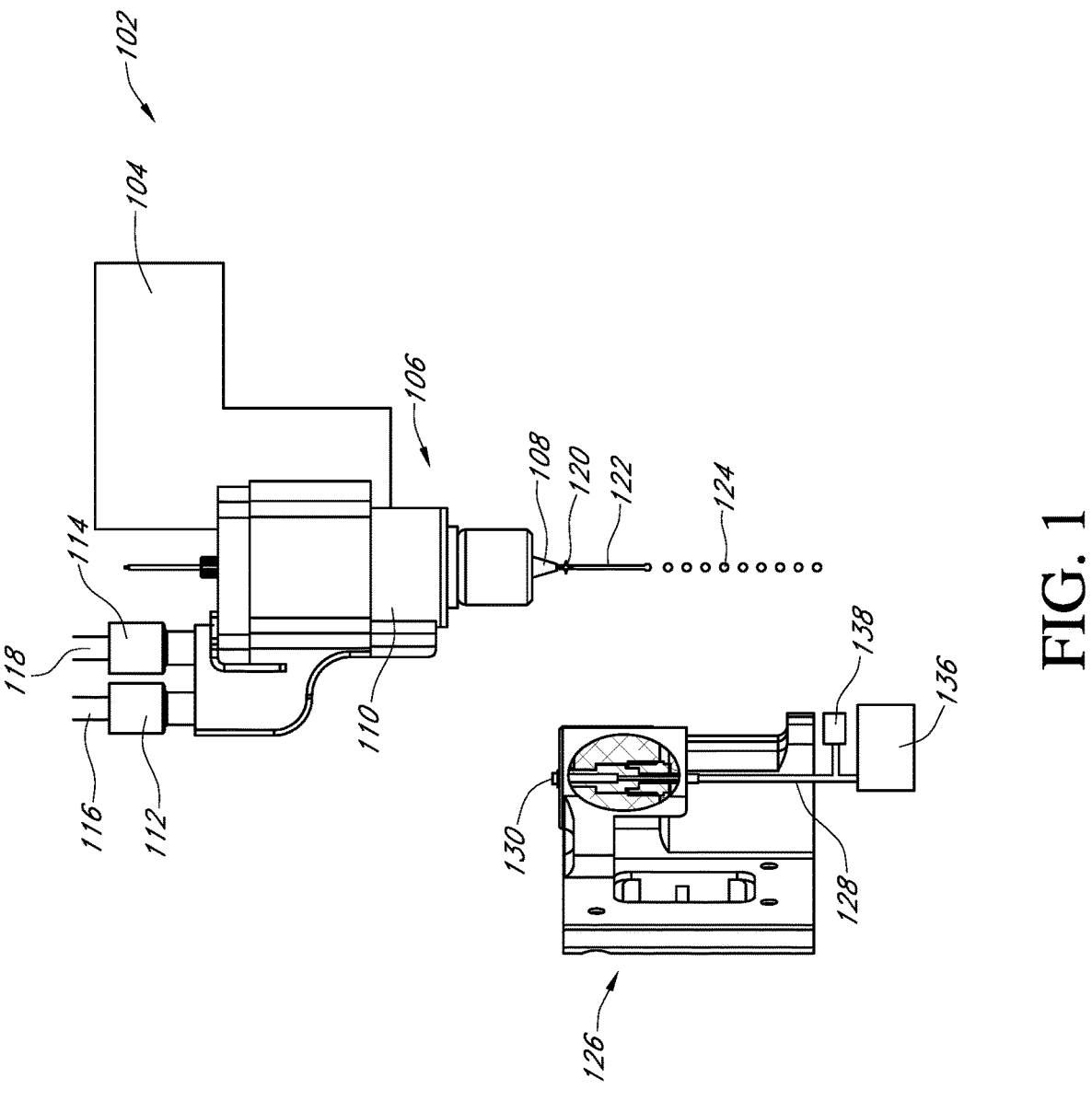
FIG. 1 is a schematic diagram of a nozzle system and docking station with the nozzle system in a position for operation.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

FIGURES

The attached figures are illustrative only and do not limit the scope of the present disclosure or the appended claims.

FIG. 1 illustrates an exemplary nozzle system 102 and a docking station 126. The nozzle system 102 can comprise a five-axis mover that moves the nozzle 106 and the nozzle tip 108 in five axes, i.e., forward and backward, side to side, vertically, and tilting in two directions. This articulation allows nozzle tip 108 to direct stream 122 to laser intersection 120 through nozzle tip 108. A vibrator (not shown) in nozzle 106 or in mechanical communication with nozzle 106 can provide a vibration that assists in breaking the stream 122 into droplets 124. Stream 122 can be, e.g., a stream of sheath fluid that is obtained from the sheath supply port 116 that is mixed with living cells or other material under analysis.

Sheath fluid can be, e.g., saline or other solution that protects the viability of the living cells that are mixed with the sheath fluid. The sheath fluid can be jetted out of the small nozzle orifice of the nozzle tip 108. Typically, the orifices range from 50 to 200 microns. For example, nozzle tip 108 can have an opening of, e.g., 50, 70, 100, 120, 150 and 200 microns.

Because nozzle tips are relatively small orifices that communicate a mixture of salt water and cells, cells can clump together to plug the orifice, and the flow cytometer's operator may have to expend significant amount time and effort to unclog the nozzle tip 108. In addition to clogging that can occur as a result of flow cytometer operation, if the nozzle system 102 is left to sit for several hours (e.g., overnight) sheath fluid can evaporate, leaving behind salt crystals in the nozzle tip 108 and/or in other locations within nozzle body 110, and this crystallization can also cause clogs or partial clogs that affect the operation of the nozzle system 102.

As described here, in the disclosure technology provides an automated way of preventing crystal formation and removing or dislodging clogs resulting from clumps of cells. As disclosed, this can be achieved by effecting relative motion between nozzle system 102 (in FIG. 1) and docking station 126 so that the nozzle tip 108 is inserted into a tip sealing cup 130. This can be accomplished by, e.g., moving nozzle system 102 such that nozzle tip 108 engages with tip sealing cup 130.

Rinse fluid (e.g., pressurized deionized water) 128 is then exerted backwards through the nozzle tip 108, which fluid in turn flushes any clogs in nozzle tip 108 out through waste disposal port 118. Other rinse fluids (e.g., ethanol, methanol, acetone) besides deionized water can be used. The nozzle tip 108 can stay in its docked position until again placed in use; in this way, fluid around the nozzle tip 108 cannot evaporate and cause salt crystals to form.

As illustrated in FIG. 1, the nozzle system 102 can be placed in an operating position (or first state) so that cell sorting or cell analysis can occur. As shown, sheath supply port 116 can be connected to nozzle body 110 and nozzle tip 108 such that with sheath supply valve 112 in the open position, stream 122 of sheath fluid can be pumped through nozzle 106. Nozzle mover 104 can be a five-axis mover configured to move nozzle tip 108 in a forward and back direction, in a side to side direction, in a vertical direction and is capable of tilting the nozzle tip 108 in two axes. This in turn allows the stream 122 that is jetted from the nozzle tip 108 to be correctly oriented to laser intersection 120, where one or more lasers can interrogate fluid (present as, e.g., a stream or as a droplet) located at intersection 120. (It should be understood, however, that nozzle mover 104 need not be a five-axis mover, as nozzle mover can be configured to move nozzle tip 108 in fewer than five axes. As an example, nozzle mover 104 can move nozzle tip in two or three directions, and can also tilt nozzle tip 108 in zero, one, or two directions.) As shown (and as described elsewhere herein), vibration can be generated in the nozzle 106 so that the stream 122 breaks into droplets 124. The presence of vibration, however, is optional, as is the presence of droplets.

Figure 2:
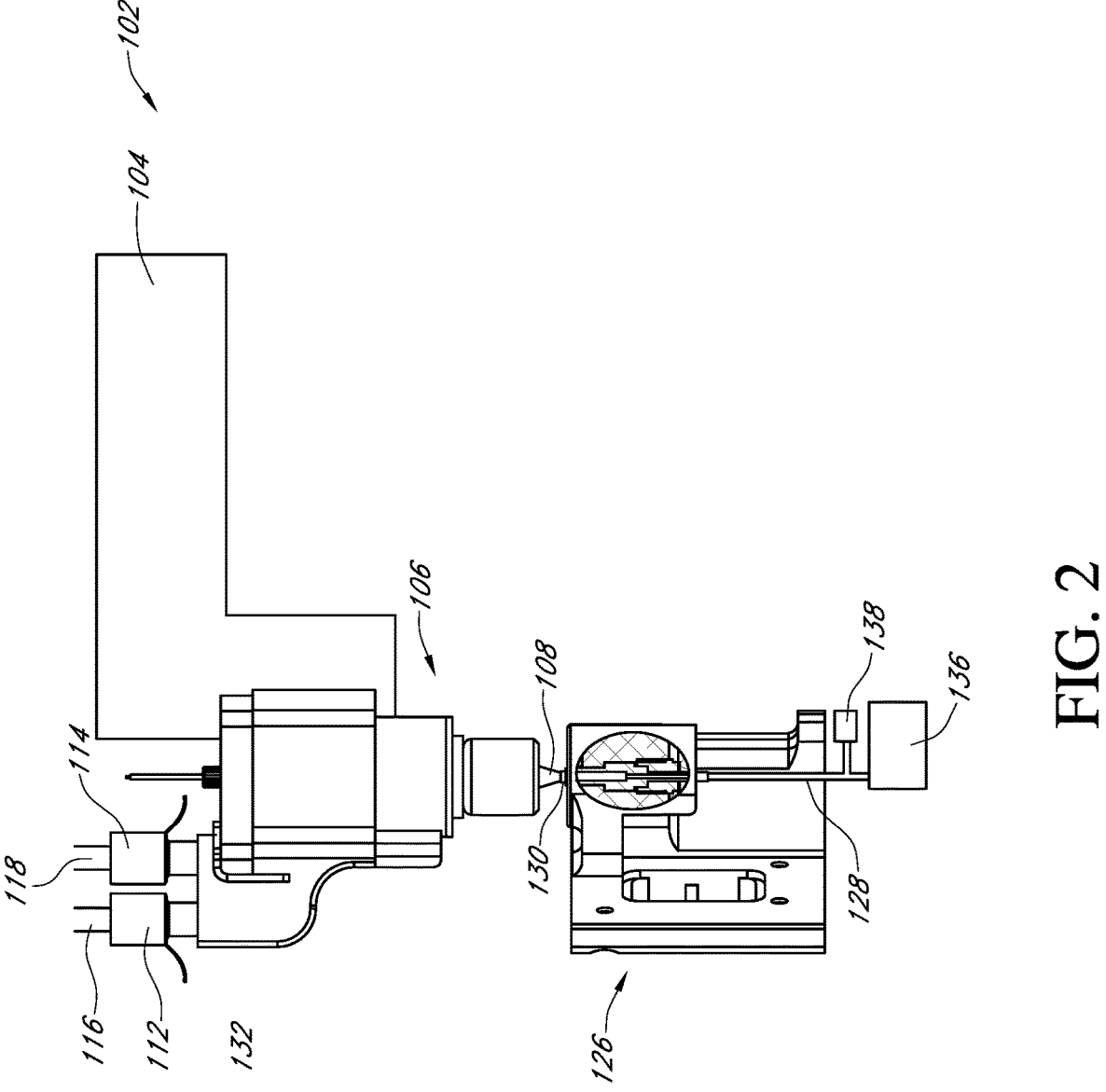
FIG. 2 is a schematic diagram of the embodiment of FIG. 1 with the nozzle system in a docked position.

Although not shown in FIG. 1 or FIG. 2, a system according to the present disclosure can also include a camera or other optics configured to collect information (e.g., visual information) related to stream 122 and/or droplets 124. As one example, a system according to the present disclosure can include one or more optical trains configured to determine if droplets 124 are breaking off from stream 122 as expected.

As some examples, a system can include an optical train that measures droplet amplitude, e.g., via visual imaging. If droplet amplitude deviates from a predetermined value (or is outside of a pre-determine range), the system can be configured to alert a user to unexpected or out-of-specification droplet formation. An optical train can also be used to assess the angle at which stream 122 exits nozzle tip 108, as the exit angle of stream 122 can be indicative of the presence of obstructing material within nozzle system 102. An optical train can, as described, include any one or more of a visual camera, an infrared camera, and a mirror or mirrors.

A mirror (or mirrors) can be disposed so as to permit determination of information related to stream 122 and/or droplets 124. As a non-limiting example of the foregoing, one or more mirrors can be disposed so as to allow evaluation of the direction of stream 122 in a first plane and also direction of stream 122 in a second plane at an angle to the first plane. Similarly, one or more mirrors can be disposed so as to allow evaluation of droplets 124 (e.g., direction, size, amplitude) in a first plane and also in a second plane at an angle to the first plane.

Sheath supply port 116 can be connected to the nozzle body 106 and nozzle tip 108 through sheath supply valve 112, which valve can be electronically operated. Similarly, waste disposal port 118 can be connected to nozzle 106 through waste valve 114, which valve can be electronically operated. In the operating condition (or first state), sheath supply valve 112 is open and waste valve 114 is closed.

As also shown in FIG. 1, docking station 126 can be located nearby to nozzle system 102. Docking station 126 can include (or be connected to) rinse fluid supply 128, which fluid supply can be pressurized to a predetermined pressure by pump 136, which pump can be, e.g., a peristaltic pump. A pressure transducer (element 138) can be used to monitor the pressure of rinse fluid supply 128.

As shown, rinse fluid supply 128 can be in fluid communication with tip sealing cup 130. Tip sealing cup 130 can be constructed from, e.g., a short segment of fluorinated ethylene-propylene (FEP) tubing or any other compliant material that is capable of forming a seal with nozzle tip 108. As one non-limiting example, FEP tubing used in tip sealing cup 130 can have an outside diameter of ⅛ inch and an inside diameter of 1/16 inch. Without being bound to any particular theory or embodiment, FEP tubing is considered especially suitable for use as tip sealing cup 130, as FEP tubing is compliant and durable and is capable of creating a seal around the nozzle tip 108 when the nozzle tip 108 is engaged with the tip sealing cup 130. Tip sealing cup 130 can be conical (or frustoconical) in configuration, but can also be cylindrical in configuration.

FIG. 2 is a schematic diagram nozzle system 102 in a docking position (or second state) with a nozzle tip 108 placed into the tip sealing cup 130. As illustrated in FIG. 2, nozzle mover 104 can move the nozzle system 102 into a docking position and lowers nozzle 106 so that nozzle tip 108 is securely engaged with tip sealing cup 130. Nozzle tip 108 can, as disclosed, be moved by the nozzle mover 104 in five axes to ensure that the nozzle tip 108 is engaged with in tip sealing cup 130. Supply valve 112 is closed (e.g., via electronic control), and waste valve 114 remains in the closed position. Rinse fluid from supply 128 is exerted via tip sealing cup 130, with nozzle tip 108 securely positioned in tip sealing cup 130. Pump 136 can exert the rinse fluid to a predetermined pressure that is monitored by pressure transducer 138. With both sheath supply valve 112 and the electronically operated waste valve 114 being in closed positions, the rinse fluid does not otherwise have a path out of nozzle 106. (Sheath supply valve 112 and waste valve 114 can be operated by control wires 132 and 134, respectively.) If there is no leak between tip sealing cup 130 and nozzle tip 108, the flow rate of the rinse fluid 128 should be zero. In that instance, a check of pump 136 that pumps the rinse fluid 128 to determine that pump 136 is not pumping provides an indication that no leak exists between nozzle tip 108 and tip sealing cup 130. A check of the pressure detected by pressure transducer 138 can also provide an indication that a leak exists at the nozzle tip/tip sealing cap intersection. This approach can be used as an alternative to checking the operation of pump 136 or in combination with checking operation of pump 136.

After checking that the peristaltic pump 136 is not pumping, and/or a pressure drop is not detected by pressure transducer 138, waste valve 114 can be opened so that rinse fluid can flow from rinse fluid supply 128 through tip sealing cup 130 and through nozzle tip 108 and nozzle body 106 to waste port 118. The pressure from rinse fluid supply 128— applied through nozzle tip 108—is sufficient to remove clogs from nozzle tip 108 and any obstructions in nozzle 106. This in turn flushes such obstructions through waste disposal port 118. (As described elsewhere herein, the pressure of rinse fluid supply 128 is modulated by the peristaltic pump 136 and pressure transducer 138.) The use of rinse fluid supply 128 (which can be non-saline, e.g., deionized water) functions to dissolve salt crystals and flush nozzle system 102 to remove salt content and other obstructions, e.g., cell clumps. This flushing flow of rinse fluid, which can take place such that the rinse fluid flows is a direction opposite to the direction in which sheath fluid flows during system operation, creates a clean system with nozzle tip 108 and nozzle body 106 that do not have obstructions from clumps of cells or crystalline salt.

Nozzle system 102 can remain in the docked position shown in FIG. 2 until the system is ready for use again, for either sorting cells or analyzing cells. As but some examples, nozzle system 102 can remain in its docked position between sample runs, overnight, or during other periods of system downtime. The nozzle system 102 can remain in the docked position illustrated in FIG. 2 for long periods of time and since the nozzle system 102 has been flushed with deionized water, and the nozzle tip 108 is sealed to the tip sealing cup 130, the nozzle tip 108 does not dry out and salt crystals do not form in the nozzle tip 108 or on an exterior surface of the nozzle tip 108.

When operation is initiated for the flow cytometer, nozzle system 102 can be moved by nozzle mover 104 to the operating position illustrated in FIG. 1. Because the cleaning and unclogging of salt and clumps of cells is automatic, an operator simply needs to initiate the operation of the flow cytometer system and is not required to take any manual steps for replacement of nozzles or any other manual steps. The system illustrated in FIGS. 1 and 2 can convert (in an automated fashion) to the operating position (or first state) illustrated in FIG. 1 upon initiation of the start up sequence. A system according to the present disclosure can be arranged so as to be convertible between the operating position and the docking position on demand by the user (e.g., during a pause in an experimental run or even in between runs), but can also be convertible between the operating position and the docketing position on a schedule, e.g., at 6:00 PM each evening, over a weekend, or according to other user-determined schedule.

When the system is in the docking position, the system can be operated using one or more profiles related to delivery of DI water, cleaner, and other decontamination fluids. A user can select the profile that they believe is best-suited to the necessary operation or even utilize their own customized settings. Delivery of one or more of DI, cleaner, and other decontamination fluid can be according to a preset time or according to a duration set by the user. The user can also select which fluids are delivered through the nozzle for cleaning. A system can be configured to detect a flowrate related to a cleaning fluid (e.g., DI water exerted into the nozzle when the system is in the docking position); if the flowrate is outside of an expected range, the system can advise the user and/or change the flow (pressure, pulsatility) of the fluid exerted into the nozzle. A system can be configured to deliver DI water separately from cleaning and decontamination fluids, but a system can also be configured to deliver those fluids simultaneously. A system can be, e.g., configured to deliver DI water, followed by cleaning and/or decontamination fluids, followed by further DI water. Other orders of fluid delivery (e.g., cleaning and/or decontamination fluids followed by DI water) can also be used. Fluids can be delivered in a constant flow and/or in a pulsatile flow. Fluids can be delivered with different flowrates (e.g., DI water delivered at a higher flowrate than cleaning and/or decontamination fluids). Likewise, fluids can be delivered with different pulsatilities.

A system can be configured such that a first flushing operation is automated as part of system startup. Following that first operation, a user can determine when to unclog and re-start stream setup. Alternatively, a system can be fully automated such that when the system detects stream or droplet flow that is outside of specifications, the system can automatically enter the docking mode. A system can also be automated so as to advise a user when out-of-specification stream or droplet flow is detected.

Without being bound to any particular theory or embodiment, droplet symmetry (besides the amplitude required for droplet formation and the stream exit angle) is another indicator of system status. In some instances, a clog can be difficult to detect visually but can manifest in the actual particle measurements from lasers, either by way of decreased signal and/or by way of increased variability in the measurement. A system can use calibration particles (e.g., beads) to check operation, and if the detected intensity is too low or variation too high, the detected intensity can indicate a partial clog.

Figure 3:
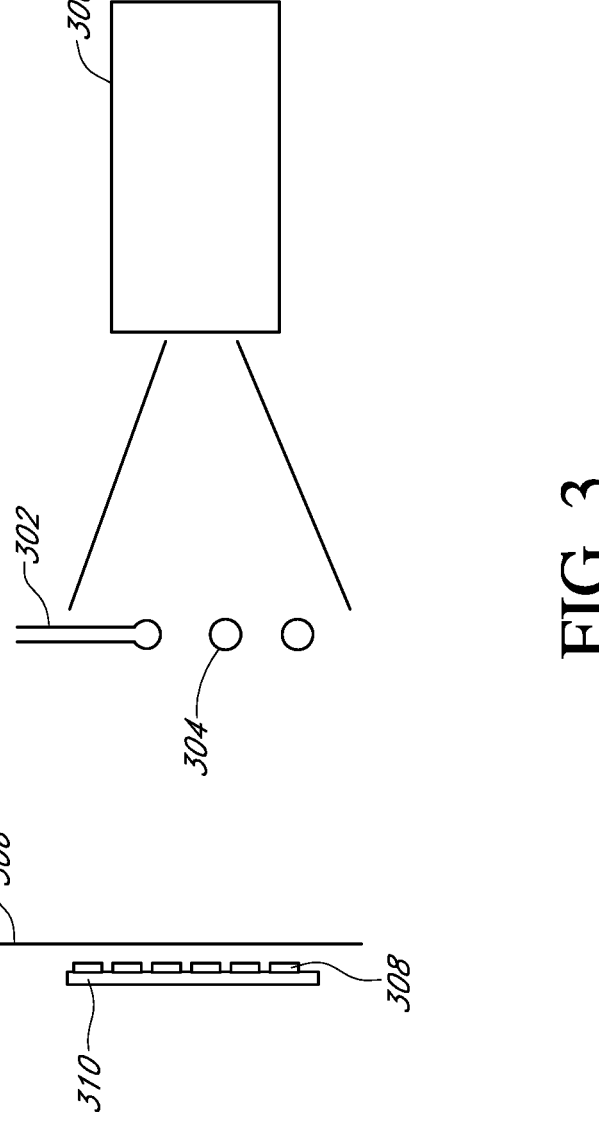
FIG. 3 provides a depiction of a fluid monitoring arrangement, showing a camera used to monitor droplet breakoff.

FIG. 3 provides an illustration of a fluid monitoring train. As shown, a droplet camera 300 can be used to view stream 302 and droplet 304 that breaks off from stream 302. Droplet camera 300 can use strobed infrared light in sync with the droplet formation to monitor the breakoff point. As shown, the train can include a column of infrared LEDs 308 (supported by support 310), which infrared LEDs can have a diffuser 306 in front of them that is directly opposite the stream from the camera. In this arrangement, camera 302 is thus really looking at stream 302 as stream 302 is back-lit. In this way, camera 300 can be used to monitor droplet formation, which droplet formation can be used to assess whether a clog has developed within the fluid flow system, e.g., at the nozzle tip (not shown).

Figure 4:
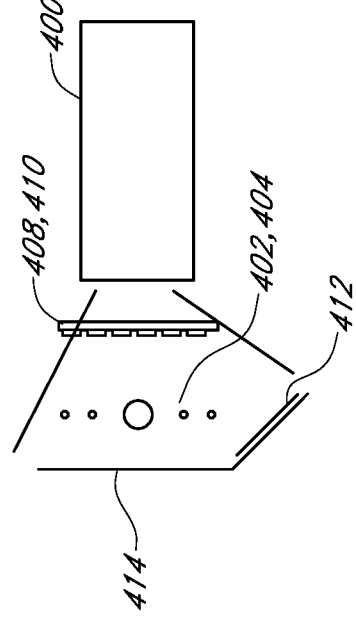
FIG. 4 provides a depiction of a fluid monitoring arrangement configured to monitor droplet and/or stream direction.
Figure 4:
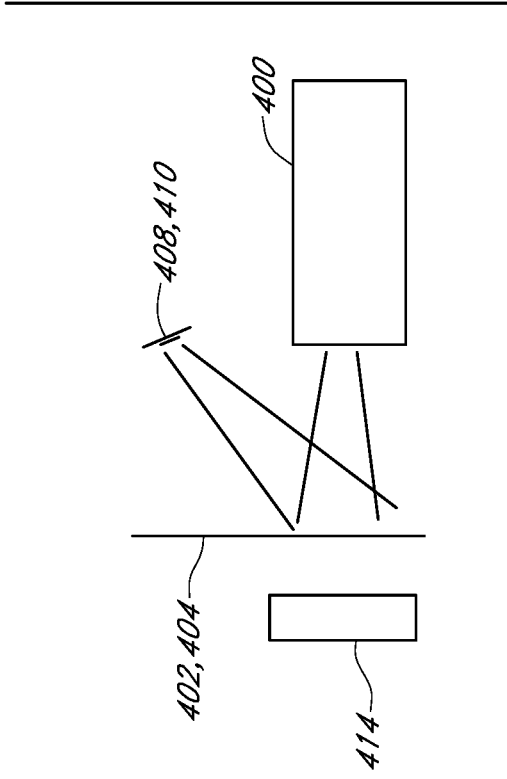

An additional train is shown in FIG. 4. This train can be placed farther downstream from the train shown in FIG. 3, and can be used to observe droplets as the droplets are deflected by an electrostatic deflection for sorting. The additional train's location at a downstream distance from the nozzle tip provides a useful point to observe the exit angle. As shown in FIG. 4 (left panel is a side view; right panel is a top view), the additional train can use infrared LEDs (408, supported by support 410) to illuminate stream 402 (and, when present, droplets 404) from the back with a camera (400) on the same side as the LEDs so as to visualize the illuminated stream and deflected droplets. A blocking background 414 can be used to keep stray light from reaching camera 400. Mirror 412 can be added to part of the background at, e.g., a 45-degree angle, such that stream 402 (and droplets 402) can be observed in the front-back angle. In this manner, camera 400 can be used to observe fluid both side-to-side and front-to-back and can detect the exit angle of the stream.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

Aspects

The following Aspects are illustrative only and do not limit the scope of the present disclosure or the appended claims.

Aspect 1. A method of unclogging a flow cytometer, comprising: converting the flow cytometer from an operating state to a docking state such that in the docking state, a nozzle system of the flow cytometer is aligned with a docking station, the converting being effected by relative motion between the nozzle system and the docking position, the docking state being such that a nozzle tip of the nozzle system engages with a tip sealing cup of the docking station so as to form a seal between the tip sealing cup and the nozzle tip, the nozzle tip being in fluid communication with at least one fluid pathway of the nozzle system; with a rinse fluid pump, communicating a rinse fluid from said docking station to the nozzle tip so as to flush the nozzle tip and at least a portion of the at least one fluid pathway.

Aspect 2. The method of Aspect 1, further comprising maintaining said nozzle system in said docking state until operation of said flow cytometer is initiated.

Aspect 3. The method of any one of Aspects 1-2, further comprising converting the flow cytometer from the docking state to the operating state.

Aspect 4. The method of Aspect 3, wherein the converting is effected in an automated fashion.

Aspect 5. The method of any one of Aspects 1-4, further comprising collecting at least one signal related to a fluid exiting the nozzle tip of the nozzle system when the flow cytometer is in the operating state.

Aspect 6. The method of Aspect 5, wherein the signal is indicative of an amplitude of fluid droplets, a direction of fluid flow, or any combination thereof.

Aspect 7. The method of any one of Aspects 5-6, wherein the converting the system from the operating state to the docking state is in response to the at least one signal.

Aspect 8. The method of Aspect 1, further comprising (a) closing a sheath fluid supply valve in fluid communication with the nozzle tip, (b) closing a waste valve in fluid communication with the nozzle tip, the waste valve being configured to permit passage therethrough of rinse fluid communicated from the docking station to the nozzle tip, or (c) both (a) and (b); and determining whether rinse fluid communicated from the docking station is leaking from the seal between the tip sealing cup and the nozzle tip.

Aspect 9. The method of Aspect 8, wherein the determining comprises detecting whether the rinse fluid pump pumps the rinse fluid.

Aspect 10. The method of any one of Aspects 8-9, wherein the determining comprises detecting a pressure of said rinse fluid.

Aspect 11. The method of any one of Aspects 8-10, further comprising opening the waste valve after determining that no leak exists at the seal between the tip sealing cup and the nozzle tip.

Aspect 12. The method of any one of Aspects 1-11, wherein the relative motion comprises movement of the nozzle system.

Aspect 13. The method of Aspect 12, wherein the movement of the nozzle system is effected by a five-axis mover.

Aspect 14. The method of any one of Aspects 1-13, wherein at least one resilient member maintains engagement between the nozzle tip and the tip sealing cup.

Aspect 15. The method of any one of Aspects 1-14, wherein the tip sealing cup comprises a resilient material.

Aspect 16. A flow cytometer system, comprising: a nozzle system comprising a nozzle tip and a sheath fluid conduit, the nozzle tip configured to communicate a sheath fluid therethrough and the nozzle tip being in communication with the sheath fluid conduit; a sheath supply valve configured to interrupt fluid communication between the nozzle tip and a supply of sheath fluid; a waste disposal port in fluid communication with the nozzle tip; a waste valve configured to interrupt fluid communication between the nozzle tip and the waste disposal port; a docking station, comprising: a rinse fluid conduit; a tip sealing cup, and a rinse fluid pump configured to exert rinse fluid into the rinse fluid conduit, the tip sealing cup configured to sealably engage with the nozzle tip so as to form a seal between the tip sealing cup and the nozzle tip; and a nozzle mover configured to move the nozzle system from an operating position to a docking position, in which docking position the nozzle tip engages with the tip sealing cup such that said rinse fluid can be communicated through the nozzle tip to the waste disposal port when said waste valve is open and said sheath supply valve is closed.

Aspect 17. The system of Aspect 16, wherein at least one of the sheath supply valve and the waste valve are electronically operated manifold valves.

Aspect 18. The system of any one of Aspects 16-17, wherein the nozzle mover is a five-axis mover.

Aspect 19. The system of any one of Aspects 16-18, further comprising a pressure transducer configured to monitor a pressure of rinse fluid pumped by the pump.

Aspect 20. The system of any one of Aspects 16-19, further comprising an optical train configured to collect at least one signal related to a fluid exiting the nozzle tip system when the nozzle tip is in the operating position.

Aspect 21. The system of Aspect 20, wherein the signal is indicative of an amplitude of fluid droplets, a direction of fluid flow, or any combination thereof.

Aspect 22. The system of any one of Aspects 20-21, wherein the nozzle mover is configured to move the nozzle system from the operating position to the docking position in response to the at least one signal.

Aspect 23. The system of any one of Aspects 16-22, wherein the system is configured such that the nozzle mover (a) moves the nozzle system from the operating position to the docking position according to a predetermined schedule, (b) moves the nozzle system from the docking position to the operating position according to a predetermined schedule, or (c) both (a) and (b).

Aspect 24. The system of any one of Aspects 16-23, further comprising a resilient member configured to maintain engagement between the nozzle tip and the tip sealing cup.

Aspect 25. The system of any one of Aspects 16-24, wherein the pump is configured to deliver the rinse fluid at a predetermined pressure sufficient to remove obstructions in the nozzle tip, the conduit, or both the nozzle tip and the conduit.

Aspect 26. A method, comprising: operating a system according to any one of Aspects 16-25.

Aspect 27. A method, comprising: (a1) with a flow cytometer in an operating state, collecting one or more signals related to a first fluid exiting an orifice of the flow cytometer; in response to the at least one signal, converting the flow cytometer from the operating state to a docking state in which the orifice is in fluid communication with a source of rinse fluid; or (a2) in response to a predetermined schedule, converting a flow cytometer having an orifice from an operating state to a docking state in which the orifice is in fluid communication with a source of rinse fluid; or (a3) in response to a user input, converting a flow cytometer having an orifice from an operating state to a docking state in which the orifice is in fluid communication with a source of rinse fluid; and (b) while the flow cytometer is in the docking state, communicating a rinse fluid through the orifice.

Aspect 28. The method of Aspect 27, wherein the first fluid comprises sample material therein.

Aspect 29. The method of any one of Aspects 27-28, wherein the first fluid exits the orifice in a first direction, and wherein the rinse fluid is exerted in a direction essentially opposite to the first direction.

Aspect 30. The method of any one of Aspects 27-29, wherein the rinse fluid is exerted so as to remove an obstruction from the orifice or a conduit with which the orifice is in fluid communication.

Aspect 31. The method of any one of Aspects 27-30, further comprising monitoring a pressure of the rinse fluid.

Aspect 32. The method of any one of Aspects 27-31, wherein converting the flow cytometer from the operating state to the docking state comprises engagement between the orifice and a tip sealing cup.

Aspect 33. The method of Aspect 32, wherein the engagement is at least partially maintained by a resilient member.

Aspect 34. The method of any one of Aspects 27-33, further comprising converting the flow cytometer from the docking state to the operating state.

Aspect 35. The method of Aspect 34, wherein converting the flow cytometer from the docking state to the operating state is effected after the rinse fluid is communicated through the orifice for a predetermined period of time.

What is claimed:

1. A method of unclogging a flow cytometer, comprising:
converting the flow cytometer from an operating state to a docking state such that in the docking state, a nozzle system of the flow cytometer is aligned with a docking station,
the converting being effected by relative motion between the nozzle system and the docking position,
the docking state being such that a nozzle tip of the nozzle system engages with a tip sealing cup of the docking station so as to form a seal between the tip sealing cup and the nozzle tip,
the nozzle tip being in fluid communication with at least one fluid pathway of the nozzle system;
with a rinse fluid pump, communicating a rinse fluid from said docking station to the nozzle tip so as to flush the nozzle tip and at least a portion of the at least one fluid pathway.

2. The method of claim 1, further comprising maintaining said nozzle system in said docking state until operation of said flow cytometer is initiated.

3. The method of claim 1, further comprising converting the flow cytometer from the docking state to the operating state, the conversion being effected in an automated fashion.

4. The method of claim 1, further comprising collecting at least one signal related to a fluid exiting the nozzle tip of the nozzle system when the flow cytometer is in the operating state, the signal is indicative of an amplitude of fluid droplets, a direction of fluid flow, or any combination thereof.

5. The method of claim 4, wherein the converting the system from the operating state to the docking state is in response to the at least one signal.

6. The method of claim 1, further comprising (a) closing a sheath fluid supply valve in fluid communication with the nozzle tip, (b) closing a waste valve in fluid communication with the nozzle tip, the waste valve being configured to permit passage therethrough of rinse fluid communicated from the docking station to the nozzle tip, or (c) both (a) and (b); and
a. determining whether rinse fluid communicated from the docking station is leaking from the seal between the tip sealing cup and the nozzle tip.

7. The method of claim 6, wherein the determining comprises detecting whether the rinse fluid pump pumps the rinse fluid or detecting a pressure of the rinse fluid.

* * * * *